(12) United States Patent
Kaltenegger et al.

(10) Patent No.: US 7,981,955 B2
(45) Date of Patent: Jul. 19, 2011

(54) ELECTRICAL INSULATION SYSTEM BASED ON POLY(DICYCLOPENTADIENE)

(75) Inventors: Kurt Kaltenegger, Lengnau (CH); Xavier Kornmann, Lauchringen (DE); Jens Rocks, Freienbach (CH); Reto Weder, Habsburg (CH)

(73) Assignee: ABB Research Ltd, Zurich (CH)

( * ) Notice: Subject to any disclaimer, the term of this patent is extended or adjusted under 35 U.S.C. 154(b) by 506 days.

(21) Appl. No.: 12/114,067

(22) Filed: May 2, 2008

(65) Prior Publication Data

US 2008/0233299 A1 Sep. 25, 2008

Related U.S. Application Data

(63) Continuation of application No. PCT/CH2006/000623, filed on Nov. 7, 2006.

(30) Foreign Application Priority Data

Nov. 7, 2005 (EP) ..................................... 05405622

(51) Int. Cl.
*C08L 45/00* (2006.01)
(52) U.S. Cl. ........ 524/268; 524/424; 524/425; 524/430; 524/444; 524/493; 524/497; 524/553; 524/554; 524/462; 524/463
(58) Field of Classification Search .................. None
See application file for complete search history.

(56) References Cited

U.S. PATENT DOCUMENTS

| | | | |
|---|---|---|---|
| 4,520,181 A * | 5/1985 | Klosiewicz | 525/247 |
| 4,966,928 A | 10/1990 | Kitagawa et al. | |
| 5,831,108 A | 11/1998 | Grubbs et al. | |
| 6,001,909 A * | 12/1999 | Setiabudi | 524/265 |
| 6,111,121 A | 8/2000 | Grubbs et al. | |
| 2003/0035992 A1* | 2/2003 | Yoshida et al. | 429/34 |
| 2004/0126557 A1* | 7/2004 | Thiele et al. | 428/304.4 |

FOREIGN PATENT DOCUMENTS

| | | |
|---|---|---|
| CA | 1 244 192 A | 11/1988 |
| EP | 0 283 719 A2 | 9/1988 |
| EP | 1 535 941 A1 | 6/2005 |
| JP | 61-296036 A2 | 12/1986 |
| JP | 2000-327756 A | 11/2000 |

OTHER PUBLICATIONS

Form PCT/ISA/210 (International Search Report) dated Jan. 16, 2007.
Form PCT/ISA/237 (Written Opinion of the International Searching Authority) dated Jan. 16, 2007.
European Search Report dated Jan. 16, 2006.
Chemical Abstracts of JP 61-296036, Dec. 26, 1986, AN 107:97841, "Polycyclic Olefin Laminated Boards", pp. 1-10, XP-002358979.
Chemical Abstracts of JP 2000-327756, Nov. 28, 2000, AN 2001-128684, "Polymerization Process for Ring Opening Norbornene and Dicyclopentadiene, Where a Polymerization Composition is Kept at a Predetermined Temperature, and Subjecting to Polymerization at a Predetermined Temperature Raising Speed", pp. 1-22, XP-002358983.
M. R. Kessler et al., "Cure Kinetics of the Ring-Opening Metathesis Polymerization of Dicyclopentadiene", Journal of Polymer Science, Part A, Polymer Chemistry, 2002, vol. 40, pp. 2373-2383.
International Preliminary Report on Patentability dated May 7, 2008.

* cited by examiner

*Primary Examiner* — Marc S Zimmer
(74) *Attorney, Agent, or Firm* — Buchanan Ingersoll & Rooney PC

(57) ABSTRACT

Electrical insulation system, which optionally contains a filler material and/or further additives, wherein said electrical insulation system comprises poly(dicyclopentadiene) as the main component, and method of making said electrical insulation system.

32 Claims, 2 Drawing Sheets

| | Mechanical | | | | | | | Thermal | | Electrical | | Hydrophobicity | |
|---|---|---|---|---|---|---|---|---|---|---|---|---|---|
| | Tensile | | | Flexural | | Double Torsion | | Glass Transition | Thermal Expansion Coefficient (CTE) | Dielectric | | Contact angle | |
| | Strength | E | ε | Strength | E | $K_{Ic}$ | $G_{Ic}$ | Tg (DSC) | | ε (50 Hz, 23°C) | Tan δ (50 Hz, 23°C) | static | advancing |
| SI Units | MPa | GPa | % | MPa | GPa | MPa.m$^{1/2}$ | J/m$^2$ | °C | 10$^{-6}$/K | - | - | ° | ° |
| Epoxy * | 71 | 3 | 1.8 | 138 | 2.9 | 0.62 | 99 | 127 | 70 | 3.4 | 0.002 | 64 | 66 |
| PDCPD ** | 45 | 1.8 | 2.1 | 78 | 1.9 | 1.8 | 2245 | 140 | 80 | 2.7 | 0.001 | 101 | 100 |

\* Anhydride cured epoxy from Huntsman (Araldite MY740: 100 pbw, Aradur HY918: 85 pbw, Accelerator DY 062: 0.5pbw) cured 2h@80°C + 2h120°C
\*\* Polydicyclopentadiene from Cymetech (Prometa XP 100 + catalyst) cured 4h@25°C + 1h@140°C (properties not optimised)

Fig. 1 (as Table 1). Comparison of the properties of anhydride-cured epoxies and poly(dicyclopentadiene).

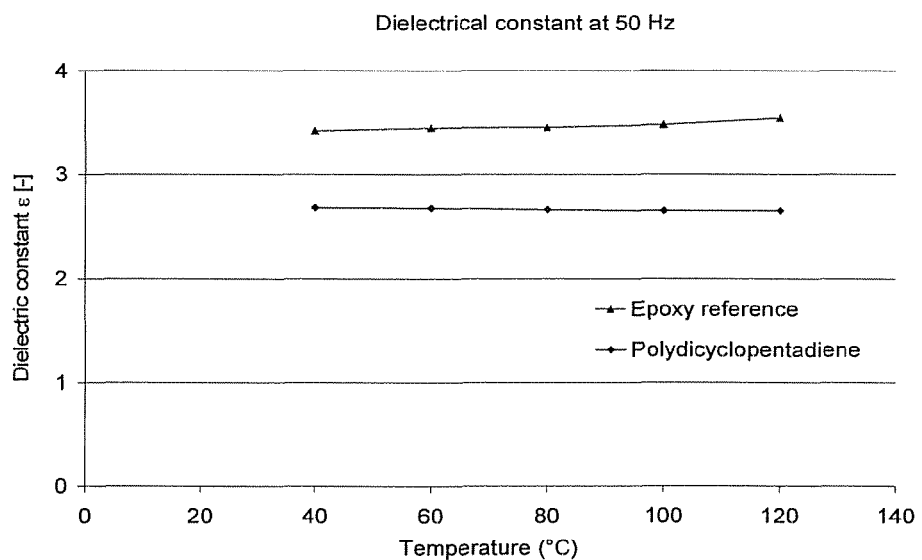

Fig. 2. Evolution of the dielectric constant at 50 Hz of epoxy and of poly(diclopentadiene) with temperature.

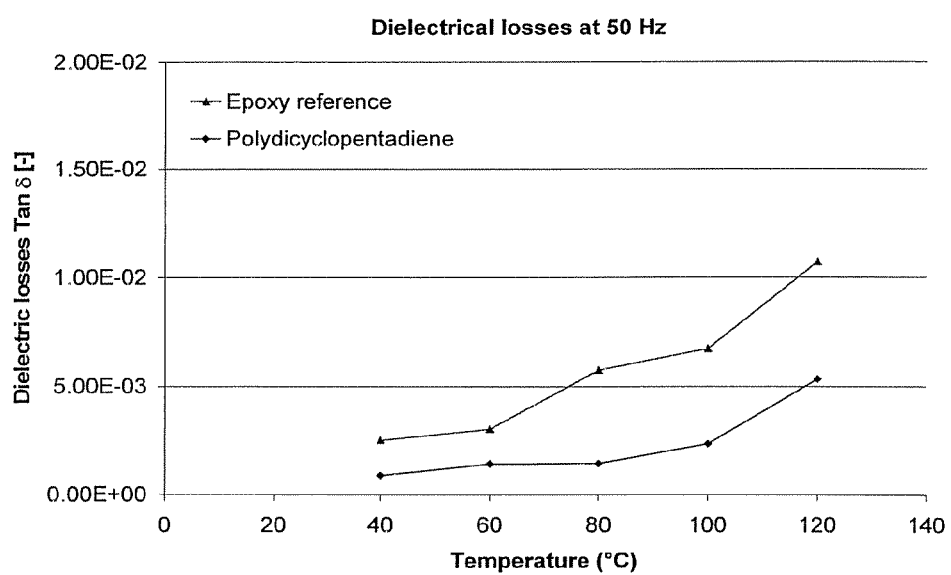
Fig. 3. Evolution of the dielectric losses at 50 Hz of unfilled poly(dicylopentadiene) compared with unfilled anhydride-cured epoxies.

ELECTRICAL INSULATION SYSTEM BASED ON POLY(DICYCLOPENTADIENE)

RELATED APPLICATIONS

This application claims priority under 35 U.S.C. §119 to EP Application 05405622.1 filed in Europe on Nov. 7, 2005, and as a continuation application under 35 U.S.C. §120 to PCT/CH2006/000623 filed as an International Application on Nov. 7, 2006 designating the U.S., the entire contents of which are hereby incorporated by reference in their entireties.

TECHNICAL FIELD

The present disclosure refers to an electrical insulation system based on poly(dicyclopentadiene), to be used for example for bushings, instruments and distribution transformers.

BACKGROUND INFORMATION

Currently, electrical insulation systems are made of anhydride-cured epoxies. The reason why electrical insulations are widely made from these materials is because they offer a good compromise between cost, electrical, mechanical and thermal properties. Anhydride cured epoxies, however, present some important drawbacks especially from an environmental point of view. The use of anhydrides is under scrutiny of different authorities and could eventually be banned in the future. Anhydride-cured epoxies also are crack sensitive materials which causes problems in various manufacturing processes.

It has now been found that poly(dicyclopentadiene), not containing or containing a filler material, can be used as an electrical insulation system for example for bushings, instruments and distribution transformers. It is curable at room temperature and easy to process. Moreover, it has been discovered that it has surprisingly good electrical properties and has a very low sensitivity to cracking due to its excellent fracture toughness. Additionally, poly(dicyclopentadiene) has surprisingly stable hydrophobic properties which makes it particularly useful for electrical outdoor applications. Dicyclopentadiene as a starting material is commercially available and cheap. It therefore offers new manufacturing possibilities which allow a decrease of production cycle time and also offers the possibility of manufacturing bulky parts with limited residual stresses.

Dicyclopentadiene as the monomeric starting material further has a low viscosity. Using such a starting material has the advantage that, due to its low viscosity, it is possible to compound the monomeric starting material with up to 85% by weight with a filler material such as silica, which is of special importance for the manufacture of filled electrical insulation parts.

The low viscosity of the starting monomer gives also the possibility to manufacture large bulky electrical insulation parts with complex shapes, e.g. via injection molding. It further opens the possibility to electrically impregnate reinforcements, like fiber fabrics or mica tapes, conventionally used in electrical insulation, which is not possible e.g. with conventional thermoplastics.

SUMMARY

An electrical insulation system is disclosed, which optionally contains a filler material and/or further additives, characterized in that said electrical insulation system is based on poly(dicyclopentadiene) resp. comprises poly(dicyclopentadiene) as the main component.

An electrical insulation system is disclosed based on poly(dicyclopentadiene), optionally containing further additives, characterized in that said poly(dicyclopentadiene) has been obtained by polymerizing dicyclopentadiene, or a low molecular weight oligomeric poly(dicyclopentadiene) resin thereof, in the presence of a suitable metathesis ring-opening catalyst and that said poly(dicyclopentadiene) contains at least one filler material or a mixture of such filler materials in an amount of up to 85% by weight, calculated to the total weight of the insulation system.

An electrical insulation system is disclosed based on poly(dicyclopentadiene), optionally containing further additives, characterized in that said poly(dicyclopentadiene) contains at least one hydrophobic compound or a mixture of such compounds, preferably an organopolysiloxane, in an amount of 0.1% to 10% by weight, calculated to the total weight of the insulation system.

An electrical insulation system is disclosed based on poly(dicyclopentadiene), optionally containing further additives, characterized in that said poly(dicyclopentadiene) contains at least one filler material or a mixture of such filler materials in an amount of up to 85% by weight, and at least one hydrophobic compound or a mixture of such compounds, preferably an organopolysiloxane, in an amount of 0.1% to 10% by weight, each calculated to the total weight of the insulation system.

The present disclosure further refers to the use of poly(dicyclopentadiene), optionally containing further additives as defined herein, as an electrical insulation system.

A method of making an electrical insulation system is disclosed, based on poly(dicyclopentadiene) optionally containing further additives as defined herein, which is characterized by (i) mixing dicyclopentadiene monomer or a low molecular weight oligomeric poly(dicyclopentadiene) resin thereof, the metathesis ring-opening catalyst and any additive which optionally is present in any desired sequence, (ii) optionally applying the mixture obtained to the surface of a shaped article, and (iii) polymerizing the mixture.

An electrical insulation system is disclosed, which comprises poly(dicyclopentadiene) as the main component.

A method of making an electrical insulation system comprising poly(dicyclopentadiene) as the main component is disclosed, the method comprising mixing dicyclopentadiene monomer or a low molecular weight oligomeric poly(dicyclopentadiene) resin thereof, along with a metathesis ring-opening catalyst and/or an additive in any desired sequence.

BRIEF DESCRIPTION OF THE DRAWINGS

FIG. 1 (as Table 1) shows an exemplary comparison of the properties of anhydride-cured epoxies and poly(dicyclopentadiene).

FIG. 2 illustrates an exemplary evolution of the dielectric constant at 50 Hz of epoxy and of poly(dicyclopentadiene) with temperature.

FIG. 3 illustrates an exemplary evolution of the dielectric losses at 50 Hz of unfilled poly(dicyclopentadiene) compared with unfilled anhydride-cured epoxies.

DETAILED DESCRIPTION

Poly(dicyclopentadiene) [poly(DCPD)] is a known as a highly cross-linked thermoset homopolymer which is formed by ring-opening metathesis polymerization of dicyclopentadiene (DCPD) which is the monomer precursor. Poly(DCPD) has been described for example in Journal of Polymer Science, Part A, Polymer Chemistry, Vol. 40, 2373-2383 (2002) Wiley Periodicals, Inc. The polymerization of dicyclopentadiene (DCPD) can schematically be illustrated as follows.

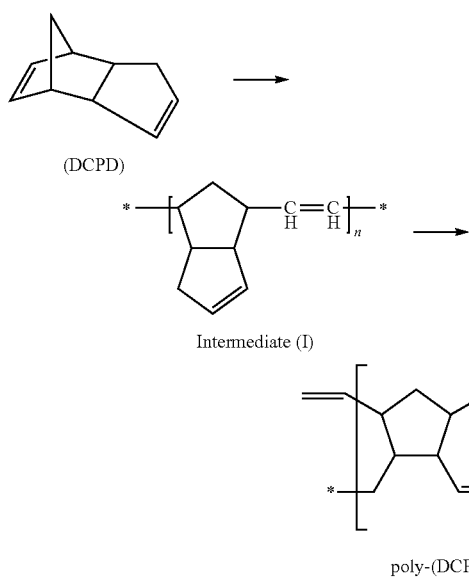

(DCPD)

Intermediate (I)

poly-(DCPD)

The monomer exists as endo-DCPD (3a,4,7,7a-tetrahydro-4, 7-methano-1H-indene) and as the exo-isomer. Both isomers can be used for the production of the electrical isolator system as disclosed in the present disclosure. Preferred however is endo-DCPD, as this material is commercially available. For the purpose of the present disclosure the commercially available material is preferably purified in order to improve the polymerization by removing the low boiling fractions, preferably by stripping off water that may be present as well as several percent of lower boiling fractions preferably under vacuum below 100° C. and at a pressure of about 90-100 mmHg.

In order to polymerize the monomer a metathesis-catalyst system is used. Metathesis-catalysts are known and are for example selected salts of ruthenium such as ruthenium, dichloro(phenylmethylene)bis(tricyclohexylphosphine); ruthenium, [1,3-bis-(2,4,6-trimethylphenyl)-2-imidazolidinylidene]dichloro(phenylmethylene)(tricyclohexylphosphine); ruthenium, dichloro[[2-(1-methylethoxy)phenyl]methylene](tricyclohexylphosphine); ruthenium, [1,3-bis(2,4,6-trimethylphenyl)-2-imidazolidinylidene]dichloro [[2-(1-methylethoxy)phenyl]methylene] or salts of tungsten, e.g. $WCl_6$ dissolved in an alcoholic or a phenolic compounds. Such catalyst are disclosed for example in U.S. Pat. Nos. 5,831,108 and 6,111,121. Further metathesis-catalyst systems are disclosed e.g. in Canadian Patent No. 1 244 192 and may used for polymerization, also in quantities known, in order to obtain a polymer that can be used according to the present disclosure. The molar concentration of the catalyst within the DCPD is preferably within the range of about 0.0005% to 0.01% by weight, preferably 0.001% to 0.005%, preferably about 0.001% by weight calculated to the total weight of monomer to be polymerized.

Polymerization may be carried out at room temperature or at somewhat elevated temperature, for example within the range of 40° C. to 70° C. whereby an exothermic reaction occurs during polymerization. Post-curing within the range of 120° C. to 200° C., preferably at about 105° C. for about 15-20 minutes is preferred.

A typical basic composition to be polymerized is for example composed of dicyclopentadiene and the metathesis-catalysts which initiates the ring-opening metathesis polymerization reaction of the cyclic monomer. The amount of catalyst added is preferably in the order of 0.1-0.5% by weight. More may be added, which is not critical. A filler material conventionally used in electrical insulation, may be added in concentrations as given herein.

According to an exemplary embodiment of the present disclosure the insulator system contains at least one filler material or a mixture of such filler materials. Filler materials for electrical isolation systems are known per se. Care must be taken that the fillers and generally the additives do not affect the activity of the polymerization catalyst. Fillers are preferably selected from the group comprising natural purified sands; silicon oxides and silicon hydroxides; aluminum oxides and aluminum hydroxides; titanium oxides and titanium hydroxides; zinc oxides and hydroxides; silicates, preferably sodium/potassium silicates, silicon aluminosilicates; mineral carbonates, preferably calcium-magnesium carbonate or calcium-silicon-magnesium carbonates; geopolymers, preferably trolites and/or zeolites based on aluminosilicates or other alkaline earth metals, glasses, mica, ceramic particles. Preferred are silicon oxides, aluminum oxides, titanium oxides, silicates, preferably silicon oxides ($SiO_2$, Quartz), aluminum oxides and hydroxides, zinc oxide, sodium/potassium silicates and/or silicon aluminosilicates. The filler may be surface treated, e.g. silanized, or untreated or be mixture thereof.

The mineral filler compound or the mixture of such compounds have a preferred average grain size (at least 50% of the grains) in the range of from about 1.0 µm to 200 µm, preferably in the range of from 1 µm to 100 µm, preferably in the range of from 5 µm to 50 µm, preferably in the range of from 5 µm to 40 µm, and especially in the range of from 5 µm to 35 µm.

The cyclic low molecular weight oligomeric poly(dicyclopentadiene) preferably contains at least one filler material or a mixture of such filler materials in an amount of up to 85% by weight. The proportion of the filler material in the insulator system is preferably in the range of from 5% to 85% by weight, preferably in the range of from 40% to 80% by weight, and in particular in the range of from 60% to 80% by weight, preferably in the range of from 65% to 75% by weight, calculated to the total weight of the insulation system, i.e. polymer, filler and further additives.

In a further exemplary embodiment of the present disclosure the electrical insulation system contains at least one hydrophobic compound or a mixture of such compounds, especially for improving the self-healing properties of the electrical insulator. For this purpose the dicyclopentadiene monomer is uniformly mixed with the hydrophobic compound or a mixture of said compounds, said hydrophobic compounds being selected from the group comprising flowable fluorinated or chlorinated hydrocarbons which contain —$CH_2$-units, —CHF-units, —$CF_2$-units, —$CF_3$-units, —CHCl-units, —$C(Cl)_2$-units, —$C(Cl)_3$-units, or mixtures thereof; or a cyclic, linear or branched flowable organopolysiloxane. Said hydrophobic compound or said mixture of said compounds may be present in encapsulated form.

The hydrophobic compound preferably has a viscosity in the range from 50 cSt to 10,000 cSt, preferably in the range from 100 cSt to 10,000 cSt, preferably in the range from 500 cSt to 3000 cSt, measured in accordance with DIN 53 019 at 20° C.

Preferably the hydrophobic compound comprises a compound, or mixture of compounds, of the general formula (II):

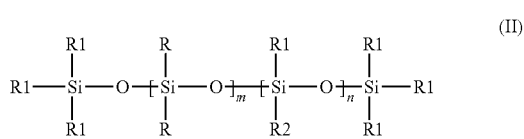

(II)

in which

R independently of each other is an unsubstituted or chlorinated or fluorinated alkyl radical having from 1 to 8 carbon atoms, ($C_1$-$C_4$-alkyl)aryl, or aryl;

$R_1$ independently at each occurrence has one of the definitions of R or $R_2$, it being possible for two terminal substituents $R_1$, attached to different Si atoms, being taken together to be an oxygen atom (=cyclic compound);

$R_2$ has one of the definitions of R, or is hydrogen or a radical -(A)$_r$-CH=$CH_2$;

A is a radical —$C_sH_{2s}$—, where s is an integer from 1 to 6;

r is zero or one;

m is on average from zero to 5000;

n is on average from zero to 100;

the sum of [m+n] for non-cyclic compounds being at least 20, and the sequence of the groups —[Si(R)(R)O]— and —[Si($R_1$)($R_2$)O]— in the molecule being arbitrary.

Preferred is the compound of the formula (II), wherein R independently of each other is an unsubstituted or fluorinated alkyl radical having from 1 to 4 carbon atoms or phenyl; A is a radical —($CH_2$)—, m is on average from 20 to 5000; n is on average from 2 to 100; the sum of [m+n] for non-cyclic compounds being on average in the range from 20 to 5000, and the sequence of the groups —[Si(R)(R)O]— and —[Si($R_1$)($R_2$)O]— in the molecule being arbitrary.

Preferred is the compound of the formula (II), wherein R independently of each other is 3,3,3-trifluoropropyl, monofluoromethyl, difluoromethyl, or alkyl having 1-4 carbon atoms; A is a radical —($CH_2$)—; m is on average from 50 to 1500; n is on average from 2 to 20; the sum of [m+n] for non-cyclic compounds being on average in the range from 50 to 1500, and the sequence of the groups —[Si(R)(R)O]— and —[Si($R_1$)($R_2$)O]— in the molecule being arbitrary. Most preferred is a compound of the formula (II) wherein each R is methyl.

Preferred cyclic compounds of formula (II) are those comprising 4-12, and preferably 4-8, —[Si(R)(R)O]-units or —[Si($R_1$)($R_2$)O]-units or a mixture of these units.

Preferred further are compounds of the formula (II) comprising a cyclic, linear or branched polydimethylsiloxane which additionally contains vinyl groups or allyl groups, preferably a cyclic, linear or branched organovinylpolysiloxane. The hydrophobic compound may be encapsulated.

The hydrophobic compound is added to the dicyclopentadiene monomer preferably in an amount of from 0.1% to 10%, preferably in an amount of from 0.25% to 5% by weigh, preferably in an amount of from 0.25% to 3% by weight, calculated to the weight of the dicyclopentadiene monomer.

Poly(dicyclopentadiene) can be processed using traditional plastic processes, including Reactive Injection Molding (RIM), open-mould casting, Resin Transfer Molding (RTM), and other known processes. The mixing of dicyclopentadiene resin with fillers can be carried out for instance with a conventional mixer, a brabender, an extruder, or an injection molding machine. The catalyst may be added either prior or after the compounding of the resin with the filler depending on the process and the reactivity of the mix. The reactivity of the polymer may be adjusted with a suitable amount of catalyst depending on the process used.

The electrical insulation system according to the present disclosure may optionally contain further additives. Such additives are pigments, antioxidants, light stabilizers and polymeric modifiers. For polymerizing the mixture of dicyclopentadiene monomer, all additives are added and well mixed with the monomer. Preferably all additives are mixed with the monomer whereby the catalyst is added at the end before polymerization if the speed of polymerization is high.

The additives are selected so that they do not negatively influence the activity of the catalyst, which is no problem for the expert in the art.

Since poly(dicyclopentadiene) contains unsaturated double bonds the polymer may be subject to oxidation. Therefore preferably some antioxidant is added, preferably in a concentration of up to 1.5% by weight calculated to the total weight of the composition. Preferably phenolic or amine antioxidants are used such as 2,6-tert.-butyl-p-cresol, N,N'-diphenyl-p-phenylene diamine.

Further additives are elastomers such as natural rubber, butyl rubber, polyisoprene, polybutadiene, polyisobutylene, ethylene-propylene copolymer, styrene-butadiene-styrene copolymer, styrene-isoprene-styrene copolymer and/or ethylene-propylene copolymer. These additives may be added provided viscosity values do not become too high.

Preferred uses of the insulation systems produced according to the present disclosure are high-voltage insulations for outdoor use, especially for outdoor insulators associated with high-voltage lines, as long-rod, composite and cap-type insulators, and also for base insulators in the medium-voltage sector, in the production of insulators associated with outdoor power switches, measuring transducers, leadthroughs, and overvoltage protectors, in switchgear construction, in power switches, dry-type transformers, and electrical machines, as coating materials for Transistors and other semiconductor elements and/or to impregnate electrical components. The present disclosure further refers to the electrical articles containing an electrical insulation system according to the present disclosure. The following examples illustrate the disclosure.

Example 1

A formulation (1A) is prepared by mixing the following components: 100 parts dicyclopentadiene (Prometa XP100 from Cymetech, Ltd.); and 0.2 parts of the Grubbs catalyst (e.g. ruthenium, [1,3-bis-(2,4,6-trimethylphenyl)-2-imidazolidinylidene]dichloro(phenylmethylene) (tricyclohexylphosphine); or ruthenium, dichloro[[2-(1-methylethoxy)phenyl]methylene](tricyclohexylphosphine).

A formulation (1B) is prepared by adding 185 parts of dry silica powder (Millisil® B12 from Silhelco) having an average particle size ($d_{50\%}$) of 16 μm to the components used in formulation (1A). The dicyclopentadiene is mixed with pre-dried silica flower until a homogeneous mixture is obtained. The catalyst is then added so that the dicyclopentadiene reacts and polymerizes to form a high molecular weight cross-linked poly(dicyclopentadiene) polymer.

The mixing phase is carried out with a conventional mixer, a brabender, an extruder, or an injection molding machine. The mould was filled at room temperature, outgassed, cured at room-temperature (25° C.) for four hours and post-cured at 140° C. for one hour to allow the dicyclopentadiene to react completely and form a high molecular weight cross-linked poly(dicyclopentadiene).

Example 2

Comparative Example

The properties of unfilled poly(dicyclopentadiene) made according to Example 1, formulation (1A), are compared with the properties of unfilled anhydride-cured epoxies. The comparison of the properties are given in FIG. 1 (as Table 1).

Example 3

Comparative Example

The evolution of the dielectric constant at 50 Hz of unfilled poly(dicyclopentadiene) made analogous to Example 1, formulation (1A), is compared with unfilled anhydride-cured epoxies. The comparison of the properties are given in FIG. 2.

Example 4

Comparative Example

The evolution of the dielectric losses at 50 Hz of unfilled poly(dicyclopentadiene) made according to Example 1 is compared with anhydride-cured epoxies. The comparison of the properties are given in FIG. 3.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. Electrical high-voltage insulation system, suitable for use as a high-voltage insulation for outdoor use, comprising:
   a filler material or a mixture of filler materials and optionally further additives, wherein said filler material or said mixture of filler materials has an average grain size, of at least 50% of the grains, in the range of from about 1.0 μm to 200 μm, and is present in an amount of from 5% to 85% by weight, calculated to the total weight of the insulation system, and
   poly(dicyclopentadiene) as the main component,
   wherein said electrical insulation system contains at least one hydrophobic compound or a mixture of such compounds comprising flowable fluorinated or chlorinated hydrocarbons which contain —CH$_2$— units, —CHF— units, —CF$_2$— units, —CF$_3$-units, —CHCl— units, —C(Cl)$_2$— units, —C(Cl)$_3$— units, or mixtures thereof; or a cyclic, linear or branched flowable organopolysiloxane, wherein said hydrophobic compound optionally is present in encapsulated form.

2. Electrical insulation system according to claim 1, wherein said poly(dicyclopentadiene) has been obtained by polymerizing dicyclopenta-diene, or a low molecular weight oligomeric poly(dicyclopentadiene) resin thereof, in the presence of a suitable metathesis ring-opening catalyst.

3. Electrical insulation system according to claim 1, wherein said poly(dicyclopentadiene) contains at least one hydrophobic compound or a mixture of such compounds in an amount of 0.1% to 10% by weight, calculated to the total weight of the insulation system.

4. Electrical insulation system according to claim 1, wherein said poly(dicyclopentadiene) contains at least one filler material or a mixture of such filler materials, and at least one hydrophobic compound or a mixture of such compounds in an amount of 0.1% to 10% by weight, each calculated to the total weight of the insulation system.

5. Electrical insulation system according to claim 1, wherein said poly(dicyclopentadiene) has been produced by polymerization of dicyclo-pentadiene in the presence of a metathesis-catalyst system.

6. Electrical insulation system according to claim 5, wherein the amount of catalyst added is 0.1-0.5% by weight.

7. Electrical insulation system according to claim 1, wherein the insulator system contains at least one filler material or a mixture of such filler materials selected from the group consisting of natural purified sands; silicon oxides and hydroxides; aluminum oxides and hydroxides; titanium oxides and hydroxides; zinc oxides and hydroxides; silicates; mineral carbonates; and geopolymers.

8. Electrical insulation system according to claim 7, wherein the mineral filler compound or the mixture of such compounds have an average grain size, of at least 50% of the grains, in the range of from 1 μm to 100 μm.

9. Electrical insulation system according to claim 7, wherein the mineral filler material or the mixture of the filler materials is present in an amount in the range of from 40% to 80% by weight, calculated to the total weight of the insulation.

10. Electrical insulation system according to claim 1, wherein said hydrophobic compound has a viscosity in the range from 50 cSt to 10,000 cSt, measured in accordance with DIN 53 019 at 20° C.

11. Electrical insulation system according to claim 1, wherein said hydrophobic compound corresponds to the general formula (II):

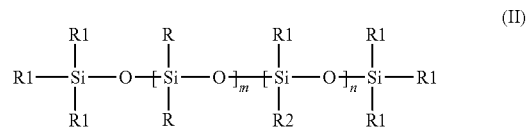

in which
R independently of each other is an unsubstituted or chlorinated or fluorinated alkyl radical having from 1 to 8 carbon atoms, (C$_1$-C$_4$-alkyl)aryl, or aryl;
R$_1$ independently at each occurrence has one of the definitions of R or R$_2$, it being possible for two terminal substituents R$_1$ attached to different Si atoms, being taken together to be an oxygen atom;
R$_2$ has one of the definitions of R, or is hydrogen or a radical -(A)$_r$-CH═CH$_2$;
A is a radical —C$_s$H$_{2s}$—, where
s is an integer from 1 to 6;
r is zero or one;
m is on average from zero to 5000;
n is on average from zero to 100;
the sum of [m+n] for non-cyclic compounds being at least 20, and the sequence of the groups —[Si(R)(R)O]— and —[Si(R$_1$)(R$_2$)O]— in the molecule being arbitrary.

12. Electrical insulation system according to claim 11, wherein a compound of the formula (II) is used, wherein R independently of each other is an unsubstituted or fluorinated alkyl radical having from 1 to 4 carbon atoms or phenyl; A is a radical —(CH$_2$)—, m is on average from 20 to 5000; n is on average from 2 to 100; the sum of [m+n] for non-cyclic compounds being on average in the range from 20 to 5000, and the sequence of the groups —[Si(R)(R)O]— and —[Si(R$_1$)(R$_2$)O]— in the molecule being arbitrary.

13. Electrical insulation system according to claim 11, wherein a compound of the formula (II) is used, wherein R independently of each other is 3,3,3-trifluoropropyl, monofluoromethyl, difluoromethyl, or alkyl having 1-4 carbon atoms; A is a radical —(CH$_2$)—; m is on average from 50 to 1500; n is on average from 2 to 20; the sum of [m+n] for non-cyclic compounds being on average in the range from 50 to 1500, and the sequence of the groups —[Si(R)(R)O]— and —[Si(R$_1$)(R$_2$)O]— in the molecule being arbitrary.

14. Electrical insulation system according to claim 11, wherein the compound of the formula (II) is a cyclic compound comprising 4-12 —[Si(R)(R)O]— units or —[Si(R$_1$)(R$_2$)O]— units or a mixture of these units.

15. Electrical insulation system according to claim 11, wherein the compound of the formula (II) is added in an amount of from 0.1% to 10%, calculated to the weight of dicyclopentadiene monomer.

16. Electrical insulation system according to claim 1, further comprising an additive selected from the group consisting of pigments, antioxidants, light stabilizers and polymeric modifiers.

17. Electrical insulation system according to claim 16, wherein the antioxidant is a phenolic or amine antioxidant, and is added in a concentration of up to 1.5% by weight calculated to the total weight of the composition.

18. Electrical insulation system according to claim 16, wherein the polymeric modifier is selected from the group consisting of natural rubber, butyl rubber, polyisoprene, polybutadiene, polyisobutylene, ethylene-propylene copolymer, styrene-butadiene-styrene copolymer, styrene-isoprenestyrene copolymer and ethylene-propylene copolymer.

19. Electrical insulation system according to claim 1, wherein said electrical insulation system is suitable for use for outdoor insulators associated with high-voltage lines, as long-rod, composite or cap-type insulators, for base insulators in a medium-voltage sector, insulators associated with outdoor power switches, measuring transducers, leadthroughs, or overvoltage protectors, in switchgear construction, in power switches, dry-type transformers, or electrical machines.

20. Electrical articles containing the electrical insulation system according to claim 1.

21. Electrical insulation system according to claim 4, wherein said poly(dicyclopentadiene) has been produced by polymerization of dicyclopentadiene in the presence of a metathesis-catalyst system.

22. Electrical insulation system according to claim 4, wherein the insulator system contains at least one filler material or a mixture of such filler materials selected from the group consisting of natural purified sands; silicon oxides and hydroxides; aluminum oxides and hydroxides; titanium oxides and hydroxides; zinc oxides and hydroxides; silicates; mineral carbonates; and geopolymers.

23. Electrical insulation system according to claim 8, wherein the mineral filler material or the mixture of the filler materials is present in an amount of from 40% to 80% by weight, calculated to the total weight of the insulation.

24. Electrical insulation system according to claim 7, wherein said electrical insulation system contains at least one hydrophobic compound or a mixture of such compounds selected from the group consisting of flowable fluorinated or chlorinated hydrocarbons which contain —$CH_2$— units, —CHF— units, —$CF_2$— units, —$CF_3$— units, —CHCl— units, —$C(Cl)_2$— units, —$C(Cl)_3$— units, or mixtures thereof; and a cyclic, linear or branched flowable organopolysiloxane, wherein said hydrophobic compound optionally is present in encapsulated form.

25. Electrical insulation system according to claim 2, further comprising at least one additive selected from the group consisting of pigments, antioxidants, light stabilizers and polymeric modifiers.

26. Electrical insulation system according to claim 2, wherein said electrical insulation system is suitable for use for outdoor insulators associated with high-voltage lines, as long-rod, composite or cap-type insulators, for base insulators in a medium-voltage sector, insulators associated with outdoor power switches, measuring transducers, leadthroughs, or overvoltage protectors, in switchgear construction, in power switches, dry-type transformers, or electrical machines, coating materials for transistors or other semiconductor elements and/or to impregnate electrical components.

27. Electrical articles comprising the electrical insulation system according to claim 2.

28. Method of making an electrical insulation system as defined in claim 1, by (i) mixing dicyclopentadiene monomer or a low molecular weight oligomeric poly(dicyclopentadiene) resin thereof, a metathesis ring-opening catalyst, at least one hydrophobic compound, and any additive which optionally is present in any desired sequence, (ii) optionally applying the mixture obtained to the surface of a shaped article, and (iii) polymerizing the mixture.

29. Electrical insulation system according to claim 2, wherein said poly(dicyclopentadiene) has been produced by polymerization of dicyclopentadiene in the presence of a metathesis-catalyst system.

30. Electrical insulation system according to claim 3, wherein said poly(dicyclopentadiene) has been produced by polymerization of dicyclopentadiene in the presence of a metathesis-catalyst system.

31. An electrical insulation system, comprising:
a filler material or a mixture of filler materials and optionally further additives,
wherein said filler material or said mixture of filler materials has an average grain size, of at least 50% of the grains, in the range of from about 1.0 µm to 200 µm, and is present in an amount of from 5% to 85% by weight, calculated to the total weight of the insulation system, and wherein the insulator system contains at least one filler material or a mixture of such filler materials selected from the group consisting of natural purified sands; silicon oxides and hydroxides; aluminum oxides and hydroxides; titanium oxides and hydroxides; zinc oxides and hydroxides; silicates; mineral carbonates; and geopolymers,
and poly(dicyclopentadiene) as the main component,
wherein said electrical insulation system contains at least one hydrophobic compound or a mixture of such compounds comprising flowable fluorinated or chlorinated hydrocarbons which contain —$CH_2$— units, —CHF— units, —$CF_2$— units, —$CF_3$— units, —CHCl— units, —$C(Cl)_2$— units, —$C(Cl)_3$— units, or mixtures thereof; or a cyclic, linear or branched flowable organopolysiloxane, wherein said hydrophobic compound optionally is present in encapsulated form.

32. A method of making the electrical insulation system of claim 31, the method comprising mixing dicyclopentadiene monomer or a low molecular weight oligomeric poly(dicyclopentadiene) resin thereof, along with a metathesis ring-opening catalyst and/or an additive in any desired sequence.

\* \* \* \* \*